Patented Sept. 19, 1922.

1,429,841

UNITED STATES PATENT OFFICE.

HENRY H. BUCKMAN, OF JACKSONVILLE, FLORIDA.

TITANIUM COMPLEX AND METHOD OF PRODUCING SAME.

No Drawing. Application filed December 20, 1920. Serial No. 432,044.

*To all whom it may concern:*

Be it known that I, HENRY H. BUCKMAN, a citizen of the United States, and a resident of Jacksonville, in the county of Duval and State of Florida, have invented certain new and useful Titanium Complexes and Methods of Producing Same, of which the following is a specification.

My present invention relates to artificial titanium complexes, i. e., materials wholly or partially composed of titanium compounds artificially derived from other substances containing titanium, and more especially from the ores of titanium, ilmenite and rutile. My invention has for its object the production of new and better complexes by a new and better method than heretofore employed.

I have discovered that when a compound of titanium, and especially ilmenite and rutile, is subjected to the action of sulphuric acid at high temperatures and pressures, the following results may be obtained. The ilmenite, if such is the substance being treated, is broken up and a whitish cake is formed. When this cake is further subjected to the action of water and heat, it yields a white compound of titanium, probably a hydrate, or a mixture of hydroxy compounds and a solution of iron sulphate mixed with some sulphuric acid and titanium sulphate. If desired, the titanium sulphate in the solution may be hydrolyzed. The iron sulphate and sulphuric acid which remain in solution may be decanted off, and the solid titanium complexes obtained.

I am aware that it is not new to treat ilmenite with sulphuric acid for the purpose of extracting the titanium; in fact this was one of the earliest methods employed by many chemists for getting the ore into solution, although its lack of completeness made it somewhat unsatisfactory. My invention constitutes an essentially new departure from this method and is productive of essentially new and different results. Whereas in the heretofore practiced method of heating ilmenite with sulphuric acid at atmospheric pressure a solution of titanium sulphate is obtained carrying some iron sulphate, and also a complex residue carrying titanium and iron which must be discarded, and all the obtainable yield of titanium recovered by hydrolysis of the sulphate solution; my process of heating the sulphuric acid and ilmenite under pressure produces directly in one step most of the titanium, which appears in the cake mentioned above, and the amount of titanium which must be recovered by hydrolysis of the small amount of sulphate solution obtained is only incidental. Instead of having a very considerable and worthless residue which must be thrown away, as in the old methods, my method gives no such residue, the iron being practically all in solution and easily decanted. Moreover, the yield of titanium recovered is very much greater in my method. I thus by a single step, or at least by a continuous process which may be regarded as a single step, start with solid ilmenite and obtain a solid, white titanium complex suitable for use as a pigment or for other uses in the arts.

I am able to obtain these different and superior results because of the novel conditions created by the practice of my invention. I do not know the exact chemical reactions which take place in my method, but believe the different results obtained are due at least partially to three factors which obtain in my method but do not obtain in methods heretofore practiced. These are (*a*) elevated temperature, obtained by virtue of the elevated pressure, (*b*) the direct affect of elevated pressure, regardless of its influence on the temperature, and (*c*) the presence of sulphur trioxide gas. Regarding this last, it will be remembered that there is no true vapor of sulphuric acid, but that this acid immediately on vaporizing decomposes into sulphur trioxide and water vapor. It will thus be seen that this set of conditions is essentially different from those obtaining in the old method of heating ilmenite with sulphuric acid at atmospheric pressure. That the products obtained by my new method are new and different is evident by their different physical characteristics. My new titanium complexes are more dense, and can be used as pigments after simple air-drying, instead of requiring calcination. Moreover, my complexes behave differently toward oils and other vehicles.

In order to enable others to practice my invention, I will give one example of it, but it will be understood that my invention is in no way limited to or by the example given.

I take ilmenite, which I prefer to use in the finely comminuted condition obtained by grinding and subsequently water floating, although I have sometimes used air-floated material. I have discovered that the extremely fine division of ilmenite or other titaniferous materials which is obtained by air and water flotation plays an important part in the speed and completenes of the processes in which sulphuric acid is used, whether pressure is employed or not, and that such floated materials give markedly different results from materials which have been simply finely ground or comminuted in the ordinary sense of the words. Hereinafter, when the term "floated" is used, either air- or water-floated material is meant. To the ilmenite I add an amount of concentrated sulphuric acid slightly in excess of the calculated amount. I sometimes use pure acid, but I prefer to use commercial concentrated acid containing water. This mixture I introduce into an acid-proof container provided with means for sealing gas-tight and heating. I then heat until the pressure generated is approximately two hundred pounds per square inch. I then add water equal to about four times the volume of the acid used. If the water is injected into the hot container, the pressure rises at first and then lowers as the bulk of the water is introduced. If the pressure is lowered below two hundred pounds during the addition of the water, I heat further till the pressure is again raised to two hundred pounds. I then allow the mixture to cool and settle. Upon opening the container, there is found a white precipitate on the bottom, and a clear liquid above. This liquid contains iron and sulphuric acid and small amounts of titanium sulphate. It is then decanted off. The solid precipitate, consisting essentially of titanium complexes, is washed and dried and is ready for use as an extremely fine, white, smooth and dense powder, having great pigmenting powers.

My invention may be practiced in a great variety of ways, and without limiting the same I will describe several of the more important variations of the above procedure which I sometimes prefer to make.

I sometimes prefer to use my new titanium complex as hereinbefore described in the calcined state. When this is the case, I take the dried complex and calcine it at a dull red heat for half an hour.

When I desire especial whiteness in the product, I mix finely ground phosphate rock with the ilmenite before heating with the acid under pressure. I sometimes prefer to add the finely ground phosphate rock at the same time I add the water, that is, subsequent to the heating with sulphuric acid under pressure and coincident with or prior to the heating of the lixiviated mass with water under pressure. I take care not to add sufficient of the phosphate rock to destroy the acid nature of the solution.

When I desire to employ my invention to produce new composite products of my new complex and other substances such as barium sulphate, lime, etc., I add these substances to the ilmenite before heating with the acid, and they appear in the final product intimately associated with the titanium complex as a composite product. For example, by adding barium sulphate to the mixture of ilmenite and sulphuric acid and treating as hereinbefore described, I have produced a composite barium-titanium product which is new and superior to similar products heretofore produced. In the same way, by adding calcium carbonate or lime, I have produced calcium-titanium products which are new and superior to others heretofore made. When producing this last named product, I prefer to use gypsum if the material is added to the mixture of sulphuric acid and ilmenite. But if it is to be added at the same time as the water, I prefer to add the calcium in the form of carbonate or hydrate, and in quantities not sufficient to destroy the acid character of the supernatant liquor.

I have discovered that my new complex, as hereinbefore described, either by itself, or when forming composite products with other substances such as the barium-titanium and calcium-titanium products hereinbefore described, is useful as a pigment, having remarkable hiding power and working well with oils and other vehicles. I have made from it and the composite products paints, inks, enamels, etc., I have discovered that these complexes make excellent fillers for rubber, linoleum and plastics. I have also discovered that they mix well with white lead, zinc, lithopone, barytes, zirconium oxide and other pigments to form mixed paints when properly mixed with oil or other suitable vehicle.

My new process is applicable not only to ilmenite but to other titaniferous materials, and especially to rutile, which is not adapted to solution methods heretofore known.

My new process not only produces new and superior products, but it produces them more economically than has been the case with products of a similar nature produced by methods heretofore known. My process makes possible a great saving in fuel, time, labor and materials.

I claim:

1. In the preparation of titanium compounds from solid substances containing titanium, that step which comprises heating the previously finely ground and floated substance with sulphuric acid under pressure substantially above normal atmosphere.

2. In the preparation of titanium compounds from solid substances containing titanium, that step which comprises heating the previously finely ground and floated substance with sulphuric acid and water under pressure substantially above normal atmosphere.

3. In the preparation of titanium compounds from solid substances containing titanium, that step which comprises heating previously finely ground and floated ilmenite with sulphuric acid under pressure substantially above normal atmosphere.

4. In the preparation of titanium compounds from solid substances containing titanium, that step which comprises heating previously finely ground and floated ilmenite with sulphuric acid and water under pressure substantially above normal atmosphere.

5. In the preparation of titanium compounds from solid substances containing titanium, those steps which comprise heating the substance with sulphuric acid under pressure substantially above normal atmosphere, adding water and further heating under pressure, and subsequently separating the solid titanium product from the supernatant liquor.

6. In the preparation of titanium compounds from solid substances containing titanium, those steps which comprise heating the previously finely ground and floated substance with sulphuric acid under pressure substantially above normal atmosphere, adding water and further heating under pressure and subsequently separating the solid titanium product from the supernatant liquor.

7. In the preparation of titanium compounds from solid substances containing titanium, those steps which comprise heating ilmenite with sulphuric acid under pressure substantially above normal atmosphere, adding water and further heating under pressure, and subsequently separating the solid titanium product from the supernatant liquor.

8. In the preparation of titanium compounds from solid substances containing titanium, those steps which comprise heating previously finely ground and floated ilmenite with sulphuric acid under pressure substantially above normal atmosphere, adding water and further heating under pressure, and subsequently separating the solid titanium product from the supernatant liquor.

9. In the preparation of titanium pigments, those steps which comprise heating previously finely ground and floated ilmenite with sulphuric acid and water under pressure substantially above normal atmosphere, adding water and further heating under pressure, and subsequently separating, drying and calcining the solid titanium product.

10. In the preparation of composite titanium pigments, that step which comprises heating simultaneously with sulphuric acid under pressure substantially above normal atmosphere both the crude titaniferous material and the material which is to accompany titanium in the composite pigment.

11. In the preparation of composite titanium pigments, the step which comprises heating simultaneously with sulphuric acid and water under pressure substantially above normal atmosphere, both the crude titaniferous material and the material which is to accompany titanium in the composite pigment.

12. In the preparation of composite titanium pigments, those steps which comprise heating simultaneously with sulphuric acid and water under pressure substantially above normal atmosphere, previously finely ground and floated ilmenite and barium sulphate, adding water and further heating under pressure, and subsequently separating, drying and calcining the solid product.

13. As a new article, the hereinbefore described titanium complex, distinguished as being a smooth, fine, white and dense powder, and consisting essentially of hyper-normal-pressure- and hyper-normal-temperature-modified oxy-titanium products of a sulphuric acid-treated titaniferous material.

14. As a new article, the hereinbefore described composite titanium pigment, distinguished as being a smooth, fine, white and dense powder, and consisting essentially of hyper-normal-pressure- and hyper-normal-temperature-modified oxy-titanium products of a sulphuric acid-treated titaniferous material associated with barium sulphate.

HENRY H. BUCKMAN.